Jan. 12, 1960  L. AZARRAGA  2,920,543
ROTARY LIGHT FOR ROTARY LENS CAMERA
Filed Oct. 2, 1958

INVENTOR.
LUIS AZARRAGA

BY Frank Mahara
ATTORNEY

United States Patent Office 2,920,543
Patented Jan. 12, 1960

2,920,543
ROTARY LIGHT FOR ROTARY LENS CAMERA
Luis Azarraga, Mineola, N.Y.

Application October 2, 1958, Serial No. 764,873

2 Claims. (Cl. 95—11)

This invention relates to a rotary light for a camera having a rotating lens.

The camera of U.S. Patent 2,844,069 is provided with a rotating lens in order to take wide angle pictures.

In order to take pictures at night it is necessary to provide light of sufficient intensity and quality.

One manner of providing the light is to have the emitted light rays disposed parallel to the lens axis.

It is an object of this invention to provide a rotary lens camera with a rotary light operated in simultaneous rotation with one another.

It is another object to provide a light the intensive focal rays of which are rotating and fall upon a scene being simultaneously photographed by a co-acting rotating lens.

Figure 1:
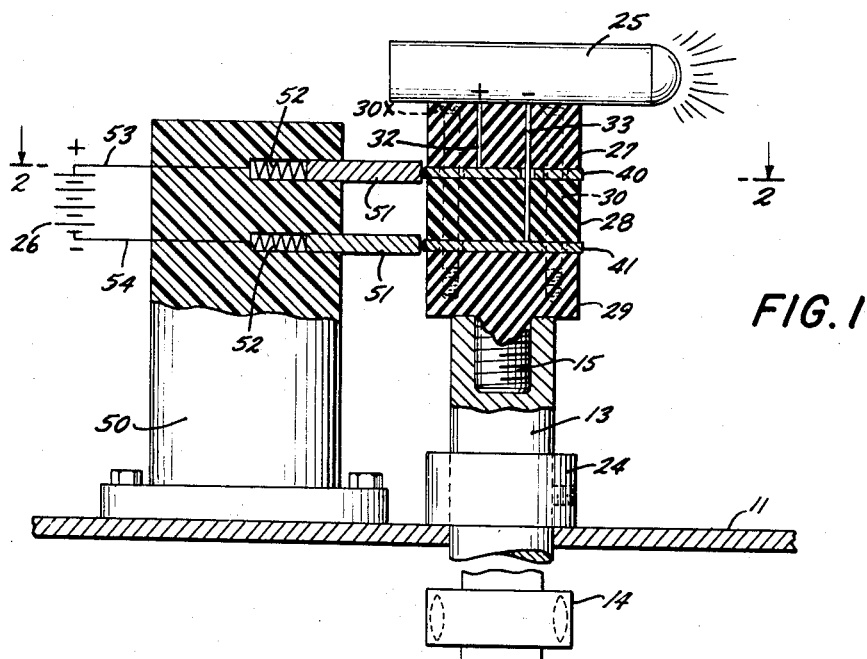
Figure 2:
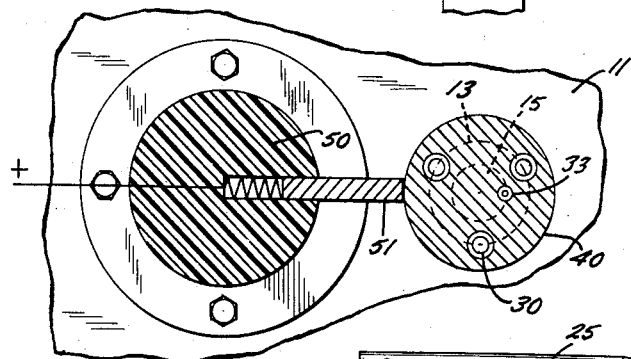
Figure 3:
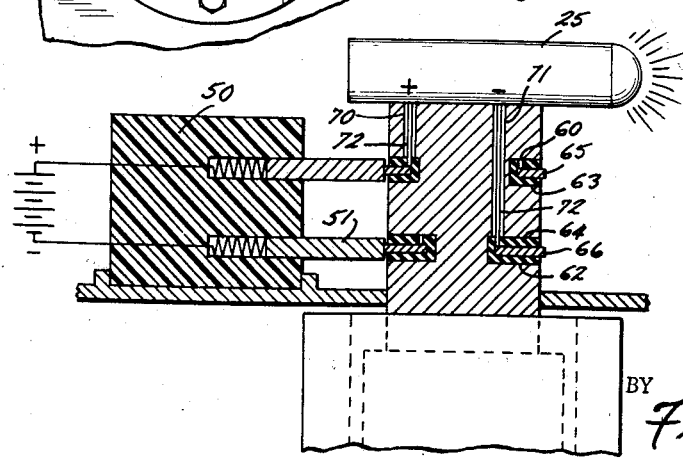

These and other objects of this invention will become apparent upon reading the following descriptive disclosure taken in conjunction with the accompanying drawing in which, Fig. 1 is a vertical section view broken away in part of a detachable battery operated light secured threadedly into a threaded cavity of the rotor shaft containing the camera lens, Fig. 2 is a view taken on line 2—2 of Fig. 1, and Fig. 3 is a view of a modification showing a lens holding rotor which is part of an electrical motor.

Turning to the drawing, the lens holding rotor shaft 13, for example of U.S. Patent 2,844,069 is provided with a threaded cavity 15. The rotor 13 is held at an adjusted height by collar 24 secured by a conventional set screw, said collar 24 being in contact with the camera housing 11.

According to this invention a suitable light 25 for example, battery operated by battery 26 is secured to the rotor so that the light rays from light 25 are vertically over and parallel to the light rays entering the camera lens assembly 14.

The detachable light unit (Fig. 1) consists of three cylindrical insulator elements 27, 28 and 29 each having at least three triangularly disposed apertures for receiving threaded holding bolts 30.

The light 25 may be secured to the top electrical plastic insulator 27 by conventional means, for example by adhesive epoxy resin or by a mechanical strap (not shown).

The plastic insulator 27 is provided with a pair of spaced-apart boreholes for receiving electrical conduits 32 and 33. The middle insulator 28 is provided with but a single borehole to receive conduit 33. The bottom insulator 29 has no boreholes for receiving conduits.

The three bolt 30 receiving cylindrical apertures of insulators 27 and 28 pass through the respective insulators in axial relationship. The bottom insulator 29 is provided with three threaded cylindrical cavities disposed axially to said three axially disposed apertures of insulators 27 and 28.

Three screw threaded bolts 30 having flared notched ends 30X are threaded into the bottom insulator after assembly of the unit.

As shown in Fig. 1, the bottom insulator 29 is provided with an integral threaded stud, which stud is fully threaded firmly into the co-acting rotor threaded cavity 15.

The apparatus of this invention is also provided with a pair of electrically conductive discs 40 and 41. Disc 40 is disposed between insulators 27 and 28 and disc 41 is disposed between insulators 28 and 29.

Each disc 40 and 41 is provided with three bolt 30 receiving apertures of extra large diameter disposed axially to the aforesaid apertures of the insulators.

The extra large diameters of the bolt receiving apertures of the conductive disc permit the bolts 30 to pass through respective disc 40 and 41 without contacting or touching them.

Also the top conductive disc 40 is provided with a fourth aperture of a diameter sufficiently large to permit conduit 33 to pass therethrough without contacting said disc 40.

The exterior diameters of all the cylindrical elements 27, 28, 29, are identical but slightly larger diameters for the conductive disc 40 and 41 are employed.

In assembling the cylindrical elements of Fig. 1, the disc 40 is disposed between insulators 27 and 28 and the disc 41 is disposed between insulator 28 and 29 whereupon the three bolts 30 are passed through their respective receiving apertures and the bolts tightened so that the bolt heads 30X are disposed below the top surface of insulator 27 and thus out of contact with the light 25. Where the light 25 is a flash light having a plastic exterior casing such precaution regarding electrical contact is unnecessary.

In order to obtain a light of sufficient intensity it is necessary to use batteries other than the conventional flashlight batteries. If flashlight batteries were sufficient all that would be necessary is to secure a conventional flashlight to the rotor 13. Moreover, the apparatus of Fig. 1, while operable with suitable portable batteries may also be operable from household current.

In order to obtain rubbing contact between an electrical source and the rotating discs 40 and 41, a plastic insulator post 50 is secured by conventional bolts to the camera top wall housing 11.

The post 50 is provided with a pair of suitably spaced-apart cylindrical cavities of a spacing equal to that of disc 40 away from disc 41. A cylindrical graphite contactor 51 is disposed in each post cavity against a helical spring 52 disposed within the respective cavity. Accordingly each spring 52 constantly urges its respective graphite contact point into contact with its respective disc 40 and 41. Suitable boreholes are provided in plastic insulator post 50 to effect contact of electrical battery 26, wires 53 and 54 with the respective spring 52.

The rotor 13 Fig. 1 may be powered by an external electrical force, for example, a second battery but the rotor 13 may also be powered by the common battery 26 used to light the light 25, if desired.

In the device of Fig. 1, electrical contact is made between electrical conduit 32 and the conductive disc 40. Also electrical contact is made between electrical conduit 33 and disc 41. In operation the current goes from the battery 26 through disc 40 and conduit 32 into the conventional light 25 and returns to the battery 26 by way of conduit 33 and disc 41, contact between the respective graphite contactors 51 being maintained with the respective discs 40 and 41 continuously throughout 360 degrees rotation.

Fig. 3 shows a modification in which the rotor is rotated by a stator disposed around the rotor. The rotor has secured to it below the stator area a lens (not shown) for taking pictures. In this modification the end of the rotor is provided with a top U-shaped annular groove 60 of small depth and a bottom annular U-shaped groove 62 of greater depth. A circular insulator tire 63 of a U-shaped cross section and of suitable dimensions is press fitted into groove 62 and a second insulator circular tire 64 of a U-shaped cross section and of suitable dimensions is press fitted in groove 62.

A first circular split washer 65 is spread apart at the split joint and disposed in the plastic or rubber tire 63 and a second split washer 66 is similarly disposed in tire 64. In lieu of split washers circular continuous coil springs (not shown) may be spread out circumferentially over the top surface of the rotor and released in the respective grooves of tires 63 and 64.

The rotor end (Fig. 3) is provided with a short borehole 70 terminating adjacent the base of groove 60 and with a longer borehole 71 terminating adjacent the base of groove 62. Boreholes 70 and 71 are parallel to the rotor cylinder wall and the borehole 71 by-passes groove 60.

A suitable cylindrical tubular insulator sleeve 72 is disposed in each borehole 70 and 71 and a copper wire is disposed in each tube 72.

The respective tires 63 and 64 are each provided with a plurality of suitable apertures in the U-shaped walls to receiver respectively the wires of the borehole 70 and 71 thereby effecting electrical contact between the light 25 and the conductive washer 65 by way of the insulated conductive wire in borehole 70 and also electrical contact between the light 25 and conductive washer 66 by way of the insulated conductive wire in borehole 71.

The operation of the modification of Fig. 3 is substantially the same as that of Fig. 1 previously described.

This invention is of broad scope and therefore not to be limited to its illustrative embodiments.

I claim:

1. An apparatus for lighting a rotating lens camera having said lens fixed to a rotor, said rotor protruding through said camera comprising a rotor protruding portion having a threaded cavity disposed in the top horizontal face of said rotor, a first plastic insulator having a threaded stud disposed in said cavity of said rotor, a second plastic insulator disposed over said first insulator, a third plastic insulator disposed over said second insulator, a first electrical circular conductor disc disposed between said second and said third insulator, a second circular electrical conductor disc disposed between said second and said third insulators, said insulators having a plurality of linearly disposed apertures, said apertures in said first insulator being threaded cavities, said circular conductors protruding circumferentially beyond said insulators and each conductor having a like plurality of apertures as said insulators but of larger diameter than said insulator diameters disposed axially to said insulator apertures, threaded bolts passed through said apertures of said insulators and said conductors to secure them rigidly together, said third insulator having a first and a second borehole therethrough, said second insulator having a single borehole disposed axially to the second borehole of the first insulator, said second circular conductor having an enlarged aperture axially disposed to said second borehole of said first insulator, an electrical conduit disposed in the first borehole and contacting the second circular disc and an electrical conduit disposed in said second borehole and contacting said first circular disc, an electrical light connected electrically to said conduits in said bore holes, and a pair of electrical graphite means urged continuously and respectively against said pair of circular conductors whereby electrical current in said graphite means is continuously transferred into the rotating circular conductors and to said light.

2. The apparatus, of claim 1 comprising an insulator post secured to said camera, said post having a pair of spaced-apart cavities, said graphite means being disposed in said cavities, spring means disposed in said post cavities and against said graphite for continuously urging said graphite in electrical contact with said circular discs and an electrical battery wire contacting each of said springs respectively to effect an electrical current.

References Cited in the file of this patent

UNITED STATES PATENTS 1,486,731   Cook _____ Mar. 11, 1924

FOREIGN PATENTS 287,488   Germany _____ Sept. 25, 1915